United States Patent
Fan et al.

(10) Patent No.: US 12,529,156 B2
(45) Date of Patent: Jan. 20, 2026

(54) SYSTEM AND METHOD FOR RECOVERING METAL RESOURCES IN COAL ASH BY MOLTEN SALT ELECTROLYSIS

(71) Applicant: Huaneng Clean Energy Research Institute, Beijing (CN)

(72) Inventors: Jinhang Fan, Beijing (CN); Shiqing Wang, Beijing (CN); Run Song, Beijing (CN); Dongfang Guo, Beijing (CN); Lianbo Liu, Beijing (CN); Shiwang Gao, Beijing (CN)

(73) Assignee: HUANENG CLEAN ENERGY RESEARCH INSTITUTE, Beijing (CN)

( * ) Notice: Subject to any disclaimer, the term of this patent is extended or adjusted under 35 U.S.C. 154(b) by 534 days.

(21) Appl. No.: 18/052,257

(22) Filed: Nov. 3, 2022

(65) Prior Publication Data
US 2023/0114074 A1 Apr. 13, 2023

Related U.S. Application Data

(63) Continuation of application No. PCT/CN2021/114690, filed on Aug. 26, 2021.

(30) Foreign Application Priority Data

Aug. 26, 2020 (CN) .......................... 202010872858.2

(51) Int. Cl.
*C25C 3/36* (2006.01)
*C25C 7/00* (2006.01)
*C25C 7/02* (2006.01)

(52) U.S. Cl.
CPC ................ *C25C 3/36* (2013.01); *C25C 7/005* (2013.01); *C25C 7/025* (2013.01)

(58) Field of Classification Search
CPC ...................................................... C25C 3/36
See application file for complete search history.

(56) References Cited

PUBLICATIONS

WIPO, International Search Report for PCT/CN2021/114690, Nov. 19, 2021.

*Primary Examiner* — Ciel P Contreras
(74) *Attorney, Agent, or Firm* — Hodgson Russ LLP

(57) ABSTRACT

A method for recovering metal resources in coal ash by molten salt electrolysis includes: calcinating the coal ash for decarburization to obtain the decarburized coal ash; subjecting the decarburized coal ash to ball milling to obtain coal ash powders; pressing the coal ash powders to form a plate; placing the plate as a cathode into an electrolyte in a reactor, and performing electrolytic reaction under an oxygen-free condition at an electrolytic reaction temperature of 550° C. to 900° C. in the reactor to obtain a reaction product; and removing the reaction product from the reactor, cooling the reaction product to room temperature in an inert atmosphere, and cleaning the cooled reaction product to obtain a silicon-aluminum based alloy.

13 Claims, 1 Drawing Sheet

SYSTEM AND METHOD FOR RECOVERING METAL RESOURCES IN COAL ASH BY MOLTEN SALT ELECTROLYSIS

CROSS-REFERENCE TO RELATED APPLICATIONS

This application a continuation of International Patent Application No. PCT/CN2021/114690, filed on Aug. 26, 2021, which claims priority to Chinese Patent Application Serial No. 202010872858.2, filed on Aug. 26, 2020, the entire disclosures of which are incorporated herein by reference.

FIELD

The present disclosure relates to the field of resources utilization of coal ash, in particular to a system and method for recovering metal resources in coal ash by molten salt electrolysis.

BACKGROUND

Coal ash is a mixture of oxides and silicates produced from the burning of coal including inorganic minerals, and is a solid waste produced by coal-fired power plants. A large number of coal is used for power generation and thus cause the production and the accumulation of the coal ash, which will occupy a large area of farmland, resulting in a great waste of the land resource and serious pollution of soil and water bodies. The heavy metal elements contained in the coal ash will also cause great harm to human health.

Therefore, there is an urgent need to develop a method and system for recovering metal resources in the coal ash.

SUMMARY

In a first aspect, a method for recovering metal resources in coal ash by molten salt electrolysis is provided. The method includes: calcinating the coal ash for decarburization to obtain the decarburized coal ash; subjecting the decarburized coal ash to ball milling to obtain coal ash powders; pressing the coal ash powders to form a plate; placing the plate as a cathode into an electrolyte in a reactor, and performing electrolytic reaction under an oxygen-free condition at an electrolytic reaction temperature of 550° C. to 900° C. in the reactor to obtain a reaction product; and removing the reaction product from the reactor, cooling the reaction product to room temperature in an inert atmosphere, and cleaning the cooled reaction product to obtain a silicon-aluminum based alloy.

In some embodiments, the method further includes adding alumina or silica to the decarburized coal ash.

In some embodiments, the method further includes heating the electrolyte to a temperature of 100° C. to 300° C. at a preset heating rate and keeping the electrolyte at the temperature; and evacuating the reactor.

In some embodiments, keeping the electrolyte at the temperature includes heating the electrolyte to the temperature in a heating rate of 4° C./min, and keeping the electrolyte at the temperature for 6 h to 48 h.

In some embodiments, the method further includes feeding an inert gas to the reactor.

In some embodiments, the electrolyte is selected from at least one of calcium chloride, lithium chloride, magnesium chloride, sodium chloride, potassium chloride and barium chloride.

In some embodiments, the ball milling is performed by dry ball milling or wet ball milling.

In some embodiments, the pressing is performed under a pressure of 10 MPa to 50 MPa.

In some embodiments, performing electrolytic reaction includes: performing electrolytic reaction under an electrolysis voltage of 2.4 V to 3.6 V with taking a graphite rod as an anode; or performing electrolytic reaction under an electrolysis voltage of 5 V to 10 V using an inert anode.

In some embodiments, the inert anode is formed of a metal or a ceramic material.

In some embodiments, performing electrolytic reaction includes: performing electrolytic reaction for 2 h to 24 h.

In some embodiments, cleaning the cooled reaction product includes cleaning the cooled reaction product with a cleaning liquid. The cleaning liquid is selected from at least one of deionized water, anhydrous ethanol, dilute hydrochloric acid or dilute sulfuric acid.

In some embodiments, the method further includes drying the cleaned reaction product.

In a second aspect, a system for recovering metal resources in coal ash by molten salt electrolysis is provided. The system includes a calcination furnace; a ball mill connected to the calcination furnace; a powder press connected to the ball mill; an electrolysis furnace connected to the powder press, provided with a pressure gauge and an electrolytic cell, and having a thermocouple disposed on an outer wall of the electrolytic cell; a gas distribution device connected to the electrolysis furnace; an evacuating device connected to the electrolysis furnace; a cleaning device connected to the electrolysis furnace; a drying device connected to the cleaner; and a reaction power supply connected to a reaction anode wiring and a reaction cathode wiring of the electrolytic cell via an opening provided on a wall of the electrolysis furnace to allow the anode wiring and the cathode wiring to pass through.

In some embodiments, the reaction power supply is a DC regulated power supply with a rated voltage of not more than 30 V.

In some embodiments, the evacuating device includes at least one vacuum pump, and an air outlet in the wall of the electrolysis furnace is communicated with an air inlet of the vacuum pump.

In some embodiments, the cleaning device includes an ultrasonic cleaner and a centrifuge.

In some embodiments, the drying device is a vacuum dryer.

In some embodiments, the electrolytic cell is a graphite crucible or a metal oxide crucible.

In some embodiments, the gas distribution device is an inert gas storage tank, and a gas inlet of the electrolysis furnace is communicated with an outlet of the inert gas storage tank.

BRIEF DESCRIPTION OF THE DRAWINGS

FIG. 1 is a block diagram showing a method for recovering metal resources in coal ash by molten salt electrolysis according to some embodiments of the present disclosure.

DETAILED DESCRIPTION

The present disclosure will be explained in detail below with reference to specific examples and accompanying drawing.

The present disclosure provides a system and method for recovering metal resources in the coal ash via molten salt electrolysis, which are capable of comprehensively recovering the metal resources in the coal ash in one-pot process. The present method and system are easy to operate.

Compared with a cryolite system in the related art, the molten salt system used in the present disclosure is greatly reduced in both toxicity and corrosivity.

FIG. 1 shows a flow chart of a method for recovering metal resources in coal ash of the present application. The present method includes the following operations.

Coal ash is calcined at a high temperature for decarburization to obtain decarburized coal ash.

The decarburized coal ash is transferred to a ball milling system and is subjected to ball milling to reduce its particle size and to allow the coal ash to have a uniform particle size distribution. Ball-milled coal ash optionally with metal oxides added is pressed under a pressurised condition to form a plate as a cathode, a soluble or insoluble material is used to form an anode, and an alkali metal, alkaline earth metal chloride or a mixture thereof is used as an electrolyte. The anode, the pressed cathode and the electrolyte are placed in a reactor for example an electrolysis furnace to form an electrolysis system. The electrolyte is heated to a temperature of 100° C. to 300° C. at a preset heating rate and kept for 6 h to 48 h to remove the moisture in the electrolyte. Before the electrolysis, a vacuum pump is used to evacuate the reactor to remove oxygen in the electrolysis system, and a gas distribution device is used to provide an inert gas to the electrolysis furnace. In the inert atmosphere, the electrolysis furnace is heated to a reaction temperature ranging from 550° C. to 900° C., and a reaction voltage is applied between the cathode and the anode and thus the electrolysis is performed (i.e., electrolytic reactions happen). After the electrolysis is finished, produced cathode reaction product is obtained and cooled to a room temperature in an inert atmosphere, and the cooled reaction product is cleaned to remove the electrolyte residue contained in the reaction product, and the cleaned product is dried to obtain a silicon-aluminum based alloy containing a small amount of iron and titanium. The electrolyte (i.e., molten salt during the electrolysis) is washed and filtered, and obtained filter residue is vacuum-dried to obtain a part of metal aluminum added into the molten salt.

The ball milling is performed by dry ball milling or wet ball milling. A liquid used in the wet ball milling process is ethanol. After the wet ball milling, a drying treatment is performed. Optionally, the metal oxide such as alumina or silicon oxide is added into the coal ash.

A rated pressure of the powder press used in the pressing process is no less than 50 MPa.

The pressing is performed under a pressure ranging from 10 MPa to 50 MPa.

The anode may be a soluble material anode or an insoluble material anode. An element of the soluble material anode is Ca, Mg, Li or C, and an element of the insoluble material anode is a metal-based or ceramic-based inert anode.

The electrolyte is selected from at least one of calcium chloride, lithium chloride, magnesium chloride, sodium chloride, potassium chloride and barium chloride.

A system for recovering metal resources in coal ash by molten salt electrolysis includes: a calcination furnace; a ball mill connected to the calcination furnace; a powder press connected to the ball mill; an electrolysis furnace connected to the powder press, provided with a pressure gauge and an electrolytic cell, and having a thermocouple disposed on an outer wall of the electrolytic cell; a gas distribution device connected to the electrolysis furnace; an evacuating device connected to the electrolysis furnace; a cleaning device connected to the electrolysis furnace; a drying device connected to the cleaner; and a reaction power supply connected to a reaction anode wiring and a reaction cathode wiring of the electrolytic cell via an opening provided on a wall of the electrolysis furnace to allow the anode wiring and the cathode wiring to pass through.

The electrolytic cell is a graphite crucible or a metal oxide crucible.

The reaction power supply is a DC regulated power supply with a rated voltage of no more than 30V.

The evacuating device includes at least one vacuum pump, and an air outlet in the wall of the electrolysis furnace is communicated with an air inlet of the vacuum pump.

The gas distribution device is an inert gas storage tank, and a gas inlet of the electrolysis furnace is communicated with an outlet of the inert gas storage tank.

The gas distribution device is an inert gas storage tank, and output gas of the gas distribution device is high-purity nitrogen or high-purity argon.

The cleaning system includes an ultrasonic cleaner and a high-speed centrifuge. The ultrasonic cleaner and the high-speed centrifuge are arranged along a material transferring/flowing direction. Cleaning liquid used in the ultrasonic cleaning process is selected from at least one of deionized water, anhydrous ethanol, dilute hydrochloric acid or dilute sulfuric acid.

The drying device is a vacuum dryer to prevent the obtained product from being further oxidized.

The present disclosure at least has the following beneficial effects.

The present method can realize the efficient and comprehensive recovery of the metal resources in the coal ash. The operations of the present method are simple. The alkali metal or alkaline earth metal chloride is used as the molten salt. Compared with a cryolite system, the present molten salt system is greatly reduced in both toxicity and corrosivity, the reaction process is safer. The carbon content in the coal ash can be effectively reduced by the decarburization treatment, the pollution of carbon in the electrolysis product can be reduced, and the purity of recovered metals can be improved. The ball milling can reduce the particle size of the coal ash precursor to a certain extent and make the particles uniform, which is beneficial to the deoxidization of the coal ash, i.e., improving the deoxidization rate in the subsequent electrolytic reduction process. The coal ash is pressed into a sheet. In this way, the gap between the coal ash particles is reduced, and the ohmic polarization between particles in the electroreduction process is reduced, thus improving the electron transfer efficiency and increasing the deoxidization. In addition, the reaction temperature required in the present disclosure is low, and the energy consumption is low.

Further, the element contents in the raw material can be adjusted and controlled by introducing metal oxide(s) into the precursor. In this way, the composition of the product and the relative proportion of the components can be precisely controlled.

The present disclosure provides a system that is configured according to the material transferring direction, and some devices of the system can be arranged in an adjustable connection relationship, and thus the present system has a flexible configuration.

Example 1

The coal ash was weighed and put into a high-temperature resistance furnace for calcination to remove carbon contained in the coal ash. The decarbonized coal ash was placed into a ball milling tank for 12 h ball milling at a rotational speed of 300 rpm. 1 g of coal ash powders were weighed and pressed at a pressure of 10 MPa to form a cathode sheet (20 mm in diameter). The pressed cathode sheet was sintered at a temperature of 800° C. in an air atmosphere for 6 h. A metal basket was used to hold the cathode sheet and the cathode sheet was fixed to a cathode current collector molybdenum rod with a molybdenum wire. A graphite rod (20 mm in diameter and 20 cm in length) was used as an anode. 500 g of $CaCl_2$ was added into an alumina crucible, and the alumina crucible was placed into a graphite crucible to avoid damages caused by a possible liquid leakage on the furnace. The use of the graphite crucible can consume oxygen, and the atmosphere in the reactor is controlled. The temperature in the reactor was raised to 250° C. and kept at this temperature for 48 h, and $CaCl_2$ was dried. The electrolysis furnace was sealed and then the evacuating device is opened to achieve a vacuum inside of the electrolysis furnace to eliminate oxygen in the electrolysis system. A vacuum valve was closed to maintain the electrolysis furnace to have a negative pressure. The electrolysis furnace was provided with inert gas. The evacuation and the supplement of the inert gas were repeated for 3 times to maintain an inert atmosphere inside the electrolysis furnace. Subsequently, under the protection of argon gas and cooling water, the temperature of the reactor was slowly increased to 850° C. at a heating rate of 4° C./min by a temperature control system.

With a graphite rod as an anode, a nickel foam as a cathode, and the $CaCl_2$ molten salt as an electrolyte, a pre-electrolysis was performed for 12 h under a constant voltage of 2.5 V to remove residual impurities in the electrolyte. After the reaction current was stable, the nickel foam cathode was taken out from the top of the reactor and replaced with the cathode sheet required for the reaction. After the electrolytic reaction was performed at the cathode sheet under a voltage of 3.0 V for 18 h, the cathode sheet was taken out of the furnace. The whole reaction process was carried out under the protection of high-purity argon gas. Obtained reaction product was transferred to the cleaning system, the cathode sheet was repeatedly soaked with deionized water and dilute hydrochloric acid (0.1 M). During cleaning, an ultrasonic cleaner was used to remove the residual molten salt from the product, and the reaction product was centrifuged. The centrifuged product was transferred to a drying system and vacuum-dried at 80° C. for 2 h to obtain a silicon-aluminum based alloy.

Example 2

The coal ash was weighed and put into a high-temperature resistance furnace for calcination to remove carbon contained in the coal ash. The decarbonized coal ash was placed into a ball milling tank for 12 h ball milling at a rotational speed of 300 rpm. 1 g of coal ash powder were weighed and pressed at a pressure of 10 MPa to form a cathode sheet (20 mm in diameter). The pressed cathode sheet was sintered at a temperature of 800° C. in an air atmosphere for 6 h. A metal basket was used to hold the cathode sheet and the cathode sheet was fixed to a cathode current collector molybdenum rod with a molybdenum wire. $CaCl_2$—NaCl was used as an electrolyte and a graphite rod was used as an anode. The electrolyte, the anode and the cathode for reaction were placed into a reactor. A temperature of the reactor was controlled in the range of 550±15° C. by a temperature control system, a constant voltage of 3.4 V was applied between the reaction anode and the reaction cathode by the reaction control system. After the electrolysis was performed for 20 h, the cathode was slowly taken out from the top of the reactor. The whole reaction process was carried out under the protection of high-purity argon gas (no less than 99.9%). After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h to obtain a silicon-aluminum based alloy.

Example 3

The coal ash was weighed and put into a high-temperature resistance furnace for calcination to remove carbon contained in the coal ash. The decarbonized coal ash was placed into a ball milling tank for 12 h ball milling at a rotational speed of 300 rpm. 1 g of coal ash powder were weighed and pressed at a pressure of 10 MPa to form a cathode sheet (20 mm in diameter). A metal basket was used to hold the cathode sheet and the cathode sheet was fixed to a cathode current collector molybdenum rod with a molybdenum wire. $CaCl_2$—NaCl was used as an electrolyte and a graphite rod was used as an anode. The electrolyte, the anode and the cathode for reaction were placed into a reactor. A temperature of the reactor was controlled in the range of 700±15° C. by a temperature control system, a constant voltage of 3.0 V was applied between the reaction anode and the reaction cathode by the reaction control system. After the electrolysis was performed for 8 h, the cathode was slowly taken out from the top of the reactor. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h to obtain a silicon-aluminum based alloy.

Example 4

The coal ash was weighed and put into a high-temperature resistance furnace for calcination to remove carbon contained in the coal ash. The decarbonized coal ash was placed into a ball milling tank for 12 h ball milling at a rotational speed of 300 rpm. 1 g of coal ash powder were weighed and pressed at a pressure of 10 MPa to form a cathode sheet (20 mm in diameter). A metal basket was used to hold the cathode sheet and the cathode sheet was fixed to a cathode current collector molybdenum rod with a molybdenum wire. $CaCl_2$—NaCl was used as an electrolyte and a graphite rod was used as an anode. The electrolyte, the anode and the cathode for reaction were placed into a reactor. A temperature of the reactor was controlled in the range of 700±15° C. by a temperature control system, a constant voltage of 3.6 V was applied between the reaction anode and the reaction cathode by the reaction control system. After the electrolysis was performed for 2 h, the cathode was slowly taken out from the top of the reactor. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h to obtain a silicon-aluminum based alloy.

Example 5

The coal ash was weighed and put into a high-temperature resistance furnace for calcination to remove carbon contained in the coal ash. The decarbonized coal ash was placed into a ball milling tank for 12 h ball milling at a rotational speed of 300 rpm. 1 g of coal ash powder were weighed and pressed at a pressure of 30 MPa to form a cathode sheet (20 mm in diameter). A metal basket was used to hold the cathode sheet and the cathode sheet was fixed to a cathode current collector molybdenum rod with a molybdenum wire. $CaCl_2$—NaCl was used as an electrolyte and a graphite rod was used as an anode. The electrolyte, the anode and the cathode for reaction were placed into a reactor. A temperature of the reactor was controlled in the range of 900±15° C. by a temperature control system, a constant voltage of 3.0 V was applied between the reaction anode and the reaction cathode by the reaction control system. After the electrolysis was performed for 2 h, the cathode was slowly taken out from the top of the reactor. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h to obtain a silicon-aluminum based alloy.

Example 6

The coal ash was weighed and put into a high-temperature resistance furnace for calcination to remove carbon contained in the coal ash. The decarbonized coal ash was placed into a ball milling tank for 12 h ball milling at a rotational speed of 300 rpm. 1 g of coal ash powder were weighed and pressed at a pressure of 20 MPa to form a cathode sheet (20 mm in diameter). A metal basket was used to hold the cathode sheet and the cathode sheet was fixed to a cathode current collector molybdenum rod with a molybdenum wire. $CaCl_2$—NaCl was used as an electrolyte and a graphite rod was used as an anode. The electrolyte, the anode and the cathode for reaction were placed into a reactor. A temperature of the reactor was controlled in the range of 800±15° C. by a temperature control system, a constant voltage of 3.0 V was applied between the reaction anode and the reaction cathode by the reaction control system. After the electrolysis was performed for 12 h, the cathode was slowly taken out from the top of the reactor. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h to obtain a silicon-aluminum based alloy.

Example 7

The coal ash was weighed and put into a high-temperature resistance furnace for calcination to remove carbon contained in the coal ash. The decarbonized coal ash was placed into a ball milling tank for 12 h ball milling at a rotational speed of 300 rpm. 1 g of coal ash powder were weighed and pressed at a pressure of 10 MPa to form a cathode sheet (20 mm in diameter). A metal basket was used to hold the cathode sheet and the cathode sheet was fixed to a cathode current collector molybdenum rod with a molybdenum wire. $CaCl_2$—NaCl was used as an electrolyte and a graphite rod was used as an anode. The electrolyte, the anode and the cathode for reaction were placed into a reactor. A temperature of the reactor was controlled in the range of 700±15° C. by a temperature control system, a constant voltage of 2.4 V was applied between the reaction anode and the reaction cathode by the reaction control system. After the electrolysis was performed for 24 h, the cathode was slowly taken out from the top of the reactor. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h to obtain a silicon-aluminum based alloy.

Example 8

The coal ash was weighed and put into a high-temperature resistance furnace for calcination to remove carbon contained in the coal ash. The decarbonized coal ash was placed into a ball milling tank for 12 h ball milling at a rotational speed of 300 rpm. 1 g of coal ash powder were weighed and pressed at a pressure of 45 MPa to form a cathode sheet (20 mm in diameter). A metal basket was used to hold the cathode sheet and the cathode sheet was fixed to a cathode current collector molybdenum rod with a molybdenum wire. $CaCl_2$—NaCl was used as an electrolyte and a graphite rod was used as an anode. The electrolyte, the anode and the cathode for reaction were placed into a reactor. A temperature of the reactor was controlled in the range of 650±15° C. by a temperature control system, a constant voltage of 3.0 V was applied between the reaction anode and the reaction cathode by the reaction control system. After the electrolysis was performed for 18 h, the cathode was slowly taken out from the top of the reactor. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h to obtain a silicon-aluminum based alloy.

Example 9

The coal ash was weighed and put into a high-temperature resistance furnace for calcination to remove carbon contained in the coal ash. The decarbonized coal ash was placed into a ball milling tank for 12 h ball milling at a rotational speed of 300 rpm. 1 g of coal ash powder were weighed and pressed at a pressure of 10 MPa to form a cathode sheet (20 mm in diameter). A metal basket was used to hold the cathode sheet and the cathode sheet was fixed to a cathode current collector molybdenum rod with a molybdenum wire. $CaCl_2$—NaCl was used as an electrolyte and a graphite rod was used as an anode. The electrolyte, the anode and the cathode for reaction were placed into a reactor. A temperature of the reactor was controlled in the range of 900±15° C. by a temperature control system, a constant voltage of 2.4 V was applied between the reaction anode and the reaction cathode by the reaction control system. After the electrolysis was performed for 5 h, the cathode was slowly taken out from the top of the reactor. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h to obtain a silicon-aluminum based alloy.

Example 10

Decarbonized coal ash and alumina were weighed and put into a ball milling tank for 12 h ball milling at a rotational speed of 300 rpm. 1 g of the mixed precursor powders were weighed and pressed at a pressure of 30 MPa to form a cathode sheet (20 mm in diameter). The pressed cathode sheet was sintered at a temperature of 800° C. in an air atmosphere for 6 h. A metal basket was used to hold the cathode sheet and the cathode sheet was fixed to a cathode current collector molybdenum rod with a molybdenum wire. $CaCl_2$ was used as an electrolyte and a graphite rod was used as an anode. The electrolyte, the anode and the cathode for reaction were placed into a reactor. A temperature of the reactor was controlled in the range of 750±15° C. by a temperature control system, a constant voltage of 2.8 V was applied between the reaction anode and the reaction cathode by the reaction control system. After the electrolysis was performed for 8 h, the cathode was slowly taken out. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h.

Silicon-aluminum based alloys with different aluminum contents can be obtained.

Example 11

Decarbonized coal ash and alumina were weighed and put into a ball milling tank for 12 h ball milling at a rotational speed of 300 rpm. 1 g of the mixed precursor powders were weighed and pressed at a pressure of 10 MPa to form a cathode sheet (20 mm in diameter). A metal basket was used to hold the cathode sheet and the cathode sheet was fixed to a cathode current collector molybdenum rod with a molybdenum wire. $CaCl_2$ was used as an electrolyte and a graphite rod was used as an anode. The electrolyte, the anode and the cathode for reaction were placed into a reactor. A temperature of the reactor was controlled in the range of 850±15° C. by a temperature control system, a constant voltage of 3.0 V was applied between the reaction anode and the reaction cathode by the reaction control system. After the electrolysis was performed for 10 h, the cathode was slowly taken out. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h.

Silicon-aluminum based alloys with different aluminum contents can be obtained. The addition of alumina into the coal ash can effectively control the aluminum content in the product.

Example 12

Coal ash and silica were weighed and put into a ball milling tank for 12 h ball milling at a rotational speed of 300 rpm. 1 g of the mixed precursor powders were weighed and pressed at a pressure of 10 MPa to form a cathode sheet (20 mm in diameter). The pressed cathode sheet was sintered at a temperature of 800° C. in an air atmosphere for 6 h. A metal basket was used to hold the cathode sheet and the cathode sheet was fixed to a cathode current collector molybdenum rod with a molybdenum wire. $CaCl_2$ was used as an electrolyte and a graphite rod was used as an anode. The electrolyte, the anode and the cathode for reaction were placed into a reactor. A temperature of the reactor was controlled in the range of 850±15° C. by a temperature control system, a constant voltage of 3.0 V was applied between the reaction anode and the reaction cathode by the reaction control system. After the electrolysis was performed for 20 h, the cathode was slowly taken out. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h.

Silicon-aluminum based alloys with different silicon contents can be obtained. The addition of silica into the coal ash can effectively control the silicon content in the product.

Example 13

The coal ash was weighed and put into a high-temperature resistance furnace for calcination to remove carbon contained in the coal ash. The decarbonized coal ash was placed into a ball milling tank for 12 h ball milling at a rotational speed of 300 rpm. 1 g of coal ash powder were weighed and pressed at a pressure of 50 MPa to form a cathode sheet (20 mm in diameter). The pressed cathode sheet was sintered at a temperature of 800° C. in an air atmosphere for 6 h. A metal basket was used to hold the cathode sheet and the cathode sheet was fixed to a cathode current collector molybdenum rod with a molybdenum wire. $CaCl_2$—NaCl was used as an electrolyte and a stable metal or ceramic material was used as an inert anode. The electrolyte, the inert anode and the reaction cathode were placed into a reactor. A temperature of the reactor was controlled in the range of 800±15° C. by a temperature control system, a constant voltage of 10 V was applied between the reaction anode and the reaction cathode by the reaction control system. After the electrolysis was performed for 24 h, the cathode was slowly taken out from the top of the reactor. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h to obtain a silicon-aluminum based alloy.

Example 14

The coal ash was weighed and put into a high-temperature resistance furnace for calcination to remove carbon contained in the coal ash. The decarbonized coal ash was placed into a ball milling tank for 12 h ball milling at a rotational speed of 300 rpm. 1 g of coal ash powder were weighed and pressed at a pressure of 10 MPa to form a cathode sheet (20 mm in diameter). A metal basket was used to hold the cathode sheet and the cathode sheet was fixed to a cathode current collector molybdenum rod with a molybdenum wire. $CaCl_2$—NaCl was used as an electrolyte and a stable metal or ceramic material was used as an inert anode. The electrolyte, the inert anode and the reaction cathode were placed into a reactor. A temperature of the reactor was controlled in the range of 900±15° C. by a temperature control system, a constant voltage of 5 V was applied between the reaction anode and the reaction cathode by the reaction control system. After the electrolysis was performed for 20 h, the cathode was slowly taken out from the top of the reactor. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h to obtain a silicon-aluminum based alloy.

Example 15

The coal ash was weighed and put into a high-temperature resistance furnace for calcination to remove carbon contained in the coal ash. The decarbonized coal ash was placed into a ball milling tank for 12 h ball milling at a rotational speed of 300 rpm. 1 g of coal ash powder were weighed and pressed at a pressure of 10 MPa to form a cathode sheet (20 mm in diameter). A metal basket was used to hold the cathode sheet and the cathode sheet was fixed to a cathode current collector molybdenum rod with a molybdenum wire. $CaCl_2$—NaCl was used as an electrolyte and a stable metal or ceramic material was used as an inert anode. The electrolyte, the inert anode and the reaction cathode were placed into a reactor. A temperature of the reactor was controlled in the range of 900±15° C. by a temperature control system, a constant voltage of 7.5 V was applied between the reaction anode and the reaction cathode by the reaction control system. After the electrolysis was performed for 22 h, the cathode was slowly taken out from the top of the reactor. The whole reaction process was carried out under the protection of high-purity argon gas. After cooling, obtained reaction product was transferred to the cleaning system and the cathode sheet was repeatedly soaked with deionized water and dilute hydrochloric acid (0.1 M). During cleaning, an ultrasonic cleaner was used to remove the residual molten salt in the product, and the reaction product was centrifuged. The centrifuged product was transferred to a drying system and vacuum-dried at 80° C. for 2 h to obtain a silicon-aluminum based alloy.

Unless specified or limited otherwise, the terms "connected," "communicated," and "fixed" and variations thereof are used broadly and encompass such as mechanical or electrical connections, communications and fixings, also can be inner connections, communications and fixings of two components, and further can be direct and indirect connections, communications and fixings, which can be understood by those skilled in the art according to the detail embodiment of the present disclosure.

Reference throughout this specification to "an embodiment," "some embodiments," "an example," or "some examples," means that a particular feature, structure, material, or characteristic described in connection with the embodiment or example is included in at least one embodiment or example of the present disclosure. Thus, the appearances of the phrases such as "in an embodiment," "in some embodiments," "in an example," or "in some examples" in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for recovering metal resources in coal ash by molten salt electrolysis, comprising:
    calcinating the coal ash for decarburization to obtain decarburized coal ash;
    subjecting the decarburized coal ash to ball milling to obtain coal ash powders;
    pressing the coal ash powders to form a plate;
    placing the plate as a cathode into an electrolyte in a reactor, and performing electrolytic reaction under an oxygen-free condition at an electrolytic reaction temperature of 550° C. to 900° C. in the reactor to obtain a reaction product; and
    removing the reaction product from the reactor, cooling the reaction product to room temperature in an inert atmosphere, and cleaning the cooled reaction product to obtain a silicon-aluminum based alloy.

2. The method of claim 1, further comprising:
adding alumina or silica to the decarburized coal ash.

3. The method of claim 1, further comprising:
    heating the electrolyte to a temperature of 100° C. to 300° C. at a preset heating rate and keeping the electrolyte at the temperature; and
    evacuating the reactor.

4. The method of claim 3, wherein keeping the electrolyte at the temperature comprises:

heating the electrolyte to the temperature with a heating rate of 4° C./min, and keeping the electrolyte at the temperature for 6 h to 48 h.

5. The method of claim 3, further comprising:

feeding an inert gas to the reactor.

6. The method of claim 1, wherein the electrolyte is selected from at least one of calcium chloride, lithium chloride, magnesium chloride, sodium chloride, potassium chloride and barium chloride.

7. The method of claim 1, wherein the ball milling is performed by dry ball milling or wet ball milling.

8. The method of claim 1, wherein the pressing is performed under a pressure of 10 MPa to 50 MPa.

9. The method of claim 1, wherein performing the electrolytic reaction comprises:

performing the electrolytic reaction under an electrolysis voltage of 2.4 V to 3.6 V when a graphite rod is used as an anode; or performing the electrolytic reaction under an electrolysis voltage of 5 V to 10 V when an inert anode is used.

10. The method of claim 9, wherein the inert anode is formed of a metal or a ceramic material.

11. The method of claim 1, wherein performing the electrolytic reaction comprises:

performing the electrolytic reaction for 2 h to 24 h.

12. The method of claim 1, wherein cleaning the cooled reaction product comprises:

cleaning the cooled reaction product with a cleaning liquid, wherein the cleaning liquid is selected from at least one of deionized water, anhydrous ethanol, dilute hydrochloric acid and dilute sulfuric acid.

13. The method of claim 1, further comprising:

drying the cleaned reaction product.

* * * * *